US011808954B2

(12) United States Patent
Lee et al.

(10) Patent No.: US 11,808,954 B2
(45) Date of Patent: Nov. 7, 2023

(54) MULTI-IMAGE DISPLAY APPARATUS INCLUDING POLARIZATION SELECTIVE LENS AND SCREEN

(71) Applicants: SAMSUNG ELECTRONICS CO., LTD., Suwon-si (KR); SEOUL NATIONAL UNIVERSITY R&DB FOUNDATION, Seoul (KR)

(72) Inventors: Changkun Lee, Seoul (KR); Seokil Moon, Seoul (KR); Byoungho Lee, Seoul (KR); Wontaek Seo, Yongin-si (KR); Geeyoung Sung, Daegu (KR); Hongseok Lee, Seoul (KR)

(73) Assignees: SAMSUNG ELECTRONICS CO., LTD., Suwon-si (KR); SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 148 days.

(21) Appl. No.: 17/474,685

(22) Filed: Sep. 14, 2021

(65) Prior Publication Data

US 2021/0405388 A1    Dec. 30, 2021

Related U.S. Application Data

(63) Continuation of application No. 16/591,152, filed on Oct. 2, 2019, now Pat. No. 11,150,485.

(30) Foreign Application Priority Data

Nov. 22, 2018    (KR) .................. 10-2018-0145645

(51) Int. Cl.
*G02B 30/00*    (2020.01)
*G02B 30/22*    (2020.01)
(Continued)

(52) U.S. Cl.
CPC ............... *G02B 30/00* (2020.01); *G02B 3/10* (2013.01); *G02B 27/10* (2013.01); *G02B 27/0172* (2013.01); *G06T 19/006* (2013.01)

(58) Field of Classification Search
CPC ........... G02B 30/00; G02B 3/10; G02B 30/22
(Continued)

(56) References Cited

U.S. PATENT DOCUMENTS

2015/0362728 A1    12/2015    Tei
2017/0269366 A1*    9/2017    Lee .................... G02B 27/0172
(Continued)

FOREIGN PATENT DOCUMENTS

CN        107966813 A    4/2018
EP        3312659 A1    4/2018
(Continued)

*Primary Examiner* — Jeffery A Williams
(74) *Attorney, Agent, or Firm* — Sughrue Mion, PLLC

(57) ABSTRACT

Provided is a multi-image display apparatus including an image forming device configured to form a first image, a first polarization plate configured to transmit a first polarization component of the first image provided from the image forming device, a second polarization plate configured to transmit a second polarization component of a second image that is provided from a path different from the first image, the second polarization component being different from the first polarization component, a screen configured to reflect and diffuse the first image, and transmit the second image, and a polarization selective lens configured to focus the first image having the first polarization component, and transmit the second image having the second polarization component without refraction.

19 Claims, 15 Drawing Sheets

(51) Int. Cl.
*G02B 3/10* (2006.01)
*G02B 27/10* (2006.01)
*G06T 19/00* (2011.01)
*G02B 27/01* (2006.01)

(58) Field of Classification Search
USPC .......................................................... 348/51
See application file for complete search history.

(56) References Cited

U.S. PATENT DOCUMENTS

2018/0107000 A1   4/2018  Sung et al.
2018/0210222 A1   7/2018  Seo et al.
2020/0096816 A1   3/2020  Lee et al.

FOREIGN PATENT DOCUMENTS

KR          10-1741912 B1   6/2017
KR    10-2018-0043072 A     4/2018
KR    10-2020-0034401 A     3/2020

* cited by examiner

MULTI-IMAGE DISPLAY APPARATUS INCLUDING POLARIZATION SELECTIVE LENS AND SCREEN

CROSS-REFERENCE TO RELATED APPLICATION

This application is a Continuation Application of U.S. application Ser. No. 16/591,152, filed Oct. 2, 2019 in the United States Patent and Trademark Office, which claims priority from Korean Patent Application No. 10-2018-0145645, filed on Nov. 22, 2018 in the Korean Intellectual Property Office, the disclosures of which are incorporated herein in their entireties by reference.

BACKGROUND

1. Field

Example embodiments of the present disclosure relate to a multi-image display apparatus such as an augmented reality system, and more particularly, to a multi-image display apparatus providing a wide angle of view using a polarization selective lens and screen while the size of the multi-image display apparatus is reduced or miniaturized.

2. Description of the Related Art

Recently, along with the development of electronic apparatuses and display apparatuses capable of implementing virtual reality (VR), interest in such apparatuses has increased. As a next step of VR, technology for implementing augmented reality (AR) and mixed reality (MR) is being researched.

Unlike VR that is based on a complete virtual world, AR is a display technique that shows the real world and over-lapped or combined virtual objects or information thereon, thereby further increasing the effect of reality. While VR is limitedly applied only to fields such as games or virtual experience, AR is advantageous in that it may be applied to various real environments. In particular, AR attracts attention as next-generation display technology suitable for a ubiquitous environment or an Internet of things (IoT) environment. AR may be an example of MR in that it shows a mixture of the real world and additional information such as virtual world.

SUMMARY

One or more example embodiments provide a multi-image display apparatus such as an augmented reality system.

Additional aspects will be set forth in part in the description which follows and, in part, will be apparent from the description, or may be learned by practice of example embodiments.

According to an aspect of an example embodiment, there is provided a multi-image display apparatus including an image forming device configured to form a first image, a first polarization plate configured to transmit a first polarization component of the first image provided from the image forming device, a second polarization plate configured to transmit a second polarization component of a second image that is provided from a path different from the first image, the second polarization component being different from the first polarization component, a screen configured to reflect and diffuse the first image, and transmit the second image, and a polarization selective lens configured to focus the first image having the first polarization component, and transmit the second image having the second polarization component without refraction.

The screen may include a first surface and a second surface that is opposite to the first surface, and the screen may further include an anisotropic holographic screen configured to reflect and diffuse light that is incident on the first surface at an angle, and transmit light incident on the second surface.

The image forming device may be disposed to provide the first image to the first surface of the screen at an angle.

The second polarization plate may be disposed on the second surface of the screen.

The screen may be configured such that a diffusion central angle is 0 degrees from a normal line perpendicular to the first surface in a central area of the first surface, and the diffusion central angle increases from the normal line perpendicular to the first surface from the central area of the first surface to edge areas of the first surface.

The screen may be configured such that the diffusion central angle is symmetrically inclined based on the central area of the first surface, and light reflected and diffused at the diffusion central angle from the first surface are gathered on a point of an optical axis.

The diffusion central angle may range from 10 degrees to 20 degrees at an edge of the first surface.

The multi-image display apparatus, wherein a diffusion angle at which light is reflected and diffused from the first surface is within 10 degrees.

The first image may include a first color image, a second color image, and a third color image, and the screen may include a first anisotropic holographic screen configured to reflect and diffuse the first color image that is incident on a first surface of the first anisotropic holographic screen at an angle, and transmit light incident on a second surface of the first anisotropic holographic screen that is opposite to the first surface, a second anisotropic holographic screen configured to reflect and diffuse the second color image that is incident on a third surface of the second anisotropic holographic screen at an angle, and transmit light incident on a fourth surface of the second anisotropic holographic screen that is opposite to the third surface, and a third anisotropic holographic screen configured to reflect and diffuse the third color image that is incident on a fifth surface of the third anisotropic holographic screen at an angle, and transmit light incident on a sixth surface of the third anisotropic holographic screen that is opposite to the fifth surface.

The image forming device may be configured to provide the first color image to the first surface of the first anisotropic holographic screen at an angle, provide the second color image to the third surface of the second anisotropic holographic screen at an angle, and provide the third color image to the fifth surface of the third anisotropic holographic screen at an angle.

The first anisotropic holographic screen may be configured to transmit the second color image and the third color image incident on the first surface, the second anisotropic holographic screen is configured to transmit the first color image and the third color image incident on the third surface, and the third anisotropic holographic screen is configured to transmit the first color image and the second color image incident on the fifth surface.

The first anisotropic holographic screen may be configured such that a diffusion central angle of the first color image is 0 degrees from a normal line perpendicular to the first surface, in a central area of the first surface, and the diffusion central angle of the first color image from the normal line perpendicular to the first surface increases from the central area of the first surface to edge areas of the first surface, the second anisotropic holographic screen is configured such that a diffusion central angle of the second color image is 0 degrees from a normal line perpendicular to the third surface in a central area of the third surface, and the diffusion central angle of the second color image from the normal line perpendicular to the third surface increases from the central area of the third surface to edge areas of the third surface, and the third anisotropic holographic screen is configured such that a diffusion central angle of the third color image is 0 degrees from a normal line perpendicular to the fifth surface in a central area of the fifth surface, and the diffusion central angle of the third color image from the normal line perpendicular to the fifth surface increases from the central area of the fifth surface to edge areas of the fifth surface.

The first anisotropic holographic screen, the second anisotropic holographic screen, and the third anisotropic holographic screen may be sequentially disposed away from the polarization selective lens, such that the first color image has a first light path length, the second color image has a second light path length greater than the first light path length, and the third color image has a third light path length greater than the second light path length, and the first anisotropic holographic screen, the second anisotropic holographic screen, and the third anisotropic holographic screen are disposed to offset chromatic aberration of the polarization selective lens.

The multi-image display apparatus may further include a light guide plate disposed between the screen and the polarization selective lens.

The light guide plate may include an input coupler configured to reflect incident light at an angle, and to provide the incident light into the light guide plate, and the image forming device may be disposed to provide the first image to the input coupler of the light guide plate.

The light guide plate may be configured to totally reflect the first image provided at an angle to the light guide plate by the input coupler, between a first surface of the light guide plate and a second surface of the light guide plate that is opposite to the first of the light guide plate, and the screen is directly disposed on the first surface of the light guide plate.

The polarization selective lens may be configured to focus light having a first circular polarization component having a first rotation direction and transmit, without change, light having a second circular polarization component having a second rotation direction which is opposite to the first rotation direction.

The polarization selective lens may include two geometric phase lenses and a polarization conversion plate between the two geometric phase lenses, the two geometric phase lenses may be configured to operate as convex lenses with respect to the light having the first circular polarization component, and operate as concave lenses with respect to the light having the second circular polarization component, and the polarization conversion plate may be configured to transmit, without change, the light having the first circular polarization component, and convert the light having the second circular polarization component into the light having the first circular polarization component.

The first polarization plate may include a first circular polarization plate configured to transmit the light having the first circular polarization component, and the second polarization plate includes a second circular polarization plate configured to transmit the light having the second circular polarization component.

The screen may include a polarization selective screen configured to reflect and diffuse light having a first linear polarization component, and transmit light having a second linear polarization component that is perpendicular to the first linear polarization component, the first polarization plate may include a first linear polarization plate configured to transmit the light having the first linear polarization component, and the second polarization plate includes a second linear polarization plate configured to transmit the light having the second linear polarization component perpendicular to the first linear polarization component, and the multi-image display apparatus may further include a ¼ wavelength plate disposed between the screen and the polarization selective lens.

BRIEF DESCRIPTION OF THE DRAWINGS

The above and/or other aspects will become apparent and more readily appreciated from the following description of example embodiments, taken in conjunction with the accompanying drawings in which.

DETAILED DESCRIPTION

Figure 1:
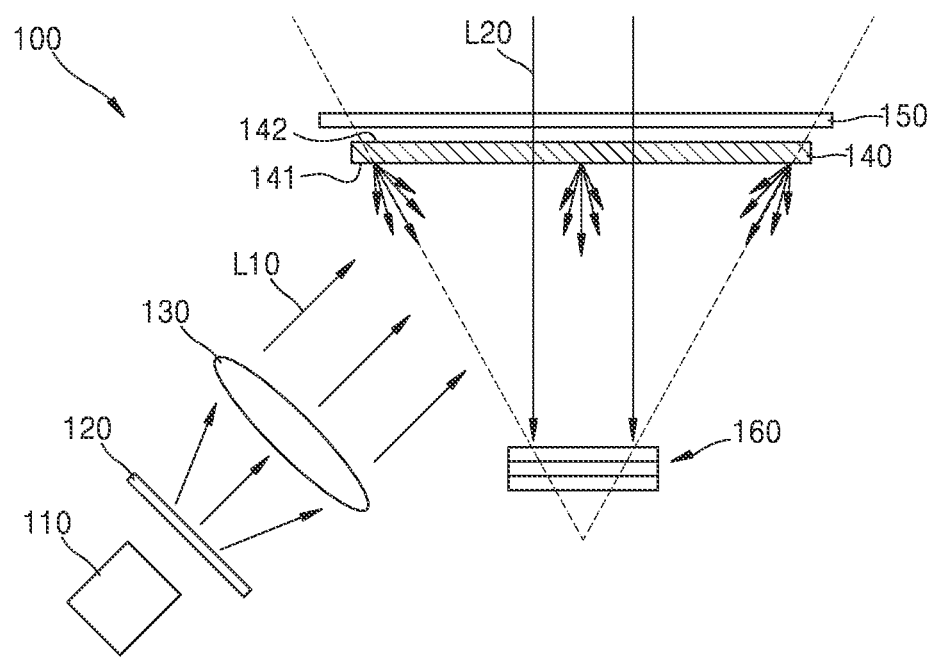
FIG. 1 is a schematic view illustrating a configuration of a multi-image display apparatus according to an example embodiment.

Hereinafter, multi-image display apparatuses including a polarization selective lens and a screen will be described with reference to the accompanying drawings. In the drawings, like reference numerals refer to like elements, and the sizes of elements may be exaggerated for clarity of illustration. Example embodiments described herein are for illustrative purposes only, and various modifications may be made therefrom. In the following description, when an element is referred to as being "above" or "on" another element in a layered structure, it may be directly on an upper, lower, left, or right side of the other element while making contact with the other element or may be above an upper, lower, left, or right side of the other element without making contact with the other element.

It will be understood that the terms "comprise" or "include" should not be construed as including all elements or steps described in the specification and may omit some elements or some steps or may further include additional elements or steps. While such terms as "first", "second", etc., may be used to describe various components, such components must not be limited to the above terms. The above terms are used only to distinguish one component from another.

As used herein, the term "and/or" includes any and all combinations of one or more of the associated listed items. Expressions such as "at least one of", when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

FIG. 1 is a schematic view illustrating a configuration of a multi-image display apparatus 100 according to an example embodiment. Referring to FIG. 1, the multi-image display apparatus 100 according to the example embodiment may include an image forming device 110 configured to form a first image L10, an anisotropic holographic screen 140 configured to reflect and diffuse the first image L10 and transmit a second image L20, and a polarization selective lens 160 configured to focus the first image L10 and transmit the second image L20 without refraction. Also, the multi-image display apparatus 100 may further include a collimating lens 130 configured to collimate the first image L10 formed by the image forming device 110 and provide the collimated first image L10 to the anisotropic holographic screen 140. When the image forming device 110 provides an image that is collimated, the collimating lens 130 may be omitted.

For example, the first image L10 may be a display image formed and provided by the image forming device 110 in the multi-image display apparatus 100 and may contain virtual reality or virtual information. The second image L20 may be an image of the outside that a user faces. The second image L20 may include an image of a foreground that the user faces, and a background subject. The second image L20 may be an image of the real world. Therefore, the multi-image display apparatus 100 of the example embodiment may be used for implementing augmented reality (AR) or mixed reality (MR). In this case, the multi-image display apparatus 100 may be a near-eye AR display apparatus.

The image forming device 110 forming the first image L10 may be configured in various ways. For example, the image forming device 110 may include a light source and a spatial light modulator. For example, the spatial light modulator may include a semiconductor modulator based on a compound semiconductor such as GaAs, a liquid crystal on silicon (LCoS) panel, a liquid crystal display (LCD) panel, a digital light projection (DLP) panel, or the like. The image forming device 110 may form the first image L10 using the light source and the spatial light modulator. The light source may, for example, include a plurality of light-emitting diodes or a plurality of laser diodes capable of emitting red light, green light, and blue light, respectively. Therefore, the first image L10 formed by the image forming device 110 may include a red image, a green image, and a blue image.

As an example, the image forming device 110 may include a display panel. For example, the display panel may include a micro light-emitting diode (LED) display panel, an organic LED (OLED) display panel, or a liquid crystal display (LCD) display panel. The first image L10 realized by using the display panel may be a two-dimensional (2D) image or a three-dimensional (3D) image. For example, the 3D image may be a hologram image, a stereo image, a light field image, an integral photography (IP) image, etc.

The polarization selective lens 160 is configured to focus incident light or transmit the incident light without refraction based on a polarization state of the incident light. For example, the polarization selective lens 160 may focus light having a first circular polarization component having a first rotation direction and may intactly transmit light having a second circular polarization component having a second rotation direction without change, which is a direction opposite to the first rotation direction. Thus, when the first image L10 formed by the image forming device 110 has the first circular polarization component, the polarization selective lens 160 may provide the first image L10 to a user's eye by focusing the first image L10. Also, when the second image L20, which is an image of the real world, has the second circular polarization component, the polarization selective lens 160 may provide the second image L20 to the user's eye without change and distortion.

To this end, the multi-image display apparatus 100 may further include a first circular polarization plate 120 for transmitting only the light having the first circular polarization component and a second circular polarization plate 150 for transmitting only the light having the second circular polarization component. The first circular polarization plate 120 is arranged on a light path of the first image L10, the light path being between the image forming device 110 and a first surface 141 of the anisotropic holographic screen 140, so that the first image L10 incident on the polarization selective lens 160 has the first circular polarization component. The second circular polarization plate 150 is arranged to face a second surface 142 of the anisotropic holographic screen 140 so that the second image L20 incident on the polarization selective lens 160 has the second circular polarization component.

Figure 2:
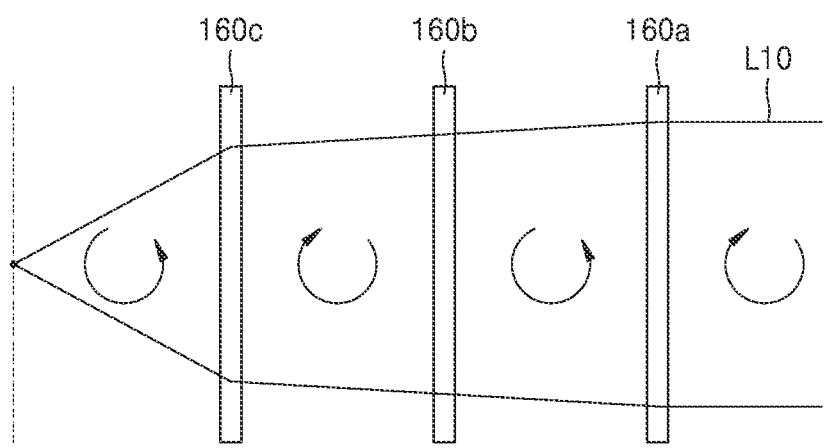
FIGS. 2 and 3 are schematic cross-sectional views illustrating an example configuration and operation of a polarization selective lens of the multi-image display apparatus illustrated in FIG. 1.
Figure 3:
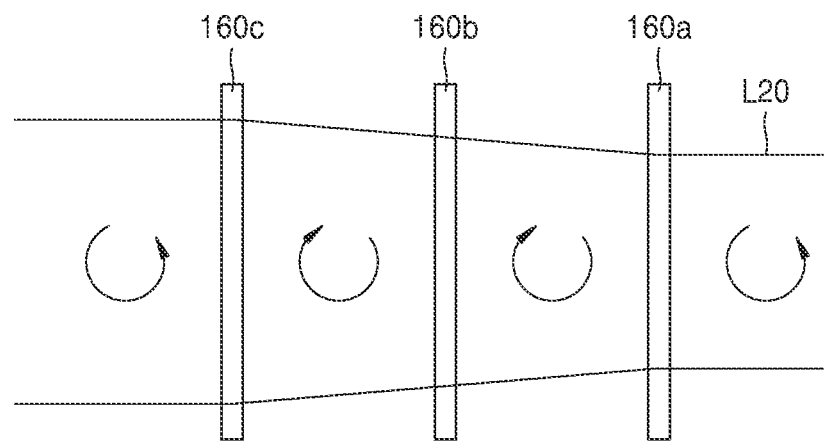

The polarization selective lens 160 may be configured in various ways. For example, FIGS. 2 and 3 are schematic cross-sectional views illustrating an example configuration and operation of the polarization selective lens 160 of the multi-image display apparatus 100 illustrated in FIG. 1. Referring to FIGS. 2 and 3, the polarization selective lens 160 may include two identical geometric phase lenses 160a and 160c and a polarization conversion plate 160b between the two same geometric phase lenses 160a and 160c. The geometric phase lenses 160a and 160c are optical devices operating as convex lenses or concave lenses, based on a polarization characteristic of incident light. For example, the geometric phase lenses 160a and 160c may operate as convex lenses having a focal distance f with respect to the light having the first circular polarization component and may operate as concave lenses having a focal distance f with respect to the light having the second circular polarization component. Also, the geometric phase lenses 160a and 160c may change a polarization direction of transmitted light into the opposite direction. The polarization conversion plate 160*b* operates to intactly transmit the light having the first circular polarization component without change and to convert the light having the second circular polarization component into the light having the first circular polarization component. The polarization conversion plate 160*b* may be formed to be very thin, and thus, when the polarization selective lens 160 is formed, the polarization conversion plate 160*b* may be coupled between the two geometric phase lenses 160*a* and 160*c*.

When the first image L10 having the first circular polarization component is incident on the polarization selective lens 160, the geometric phase lens 160*a* may act as a convex lens to the first image L10 and change a polarization state of the first image L10 to the second circular polarization component, as illustrated in FIG. 2. Then, the polarization state of the first image L10 may change back to the first circular polarization component again, by passing through the polarization conversion plate 160*b*. Then, the geometric phase lens 160*c* may act as a convex lens to the first image L10 and change the polarization state of the first image L10 to the second circular polarization component. The polarization selective lens 160 may change the polarization state of the first image L10 from the first circular polarization state to the second circular polarization state. Since the polarization conversion plate 160*b* is very thin, it may be understood that the two geometric phase lenses 160*a* and 160*c* of the polarization selective lens 160 substantially adhere to each other. When the two convex lenses adhere to each other, the focal distance reduces twice, and thus, the polarization selective lens 160 may operate as the convex lens having half of a focal distance with respect to the first image L10 having the first circular polarization component than each of the geometric phase lenses 160*a* and 160*c*, with respect to the first image L10 having the first circular polarization component.

Also, when the second image L20 having the second circular polarization component is incident on the polarization selective lens 160, the geometric phase lens 160*a* may act as a concave lens to the second image L20 and change a polarization state of the second image L20 to the first circular polarization component. The second image L20 that has the first circular polarization component may maintain the first circular polarization component by passing through the polarization conversion plate 160*b*. Then, the geometric phase lens 160*c* may act as a convex lens to the second image L20 and change the polarization state of the second image L20 to the second circular polarization component. Consequently, since the second image L20 passes through each of the concave lens and the convex lens once, the concave lens and the convex lens having the same focal distance, no optical effect may be applied to the second image L20 by passing through the polarization selective lens 160. Accordingly, the second image L20 having the second circular polarization component may pass through the polarization selective lens 160 without change and distortion.

The polarization selective lens 160 may have other configurations than the configuration described in FIGS. 2 and 3. For example, the polarization selective lens 160 may be configured by singularly using a geometric phase lens, a meta lens, a double refraction lens, a diffraction lens, etc., which have artificially designed minute diffractive patterns, or may be configured by combining at least two thereof.

The anisotropic holographic screen 140 includes the first surface 141 and the second surface 142 opposite to each other. The first surface 141 of the anisotropic holographic screen 140 is arranged toward the polarization selective lens 160 and the second surface 142 thereof is arranged toward the second circular polarization plate 150. Also, the image forming device 110 is arranged such that the first image L10 is incident into the first surface 141 of the anisotropic holographic screen 140 and the second image L20 is incident into the second surface 142 of the anisotropic holographic screen 140.

The anisotropic holographic screen 140 is configured to reflect and diffuse light incident into the first surface 141 and to intactly transmit light incident into the second surface 142. Thus, the anisotropic holographic screen 140 may operate as a screen for the first image L10 incident into the first surface 141, while functioning as a transparent flat plate for the second image L20 incident into the second surface 142.

Figure 4:
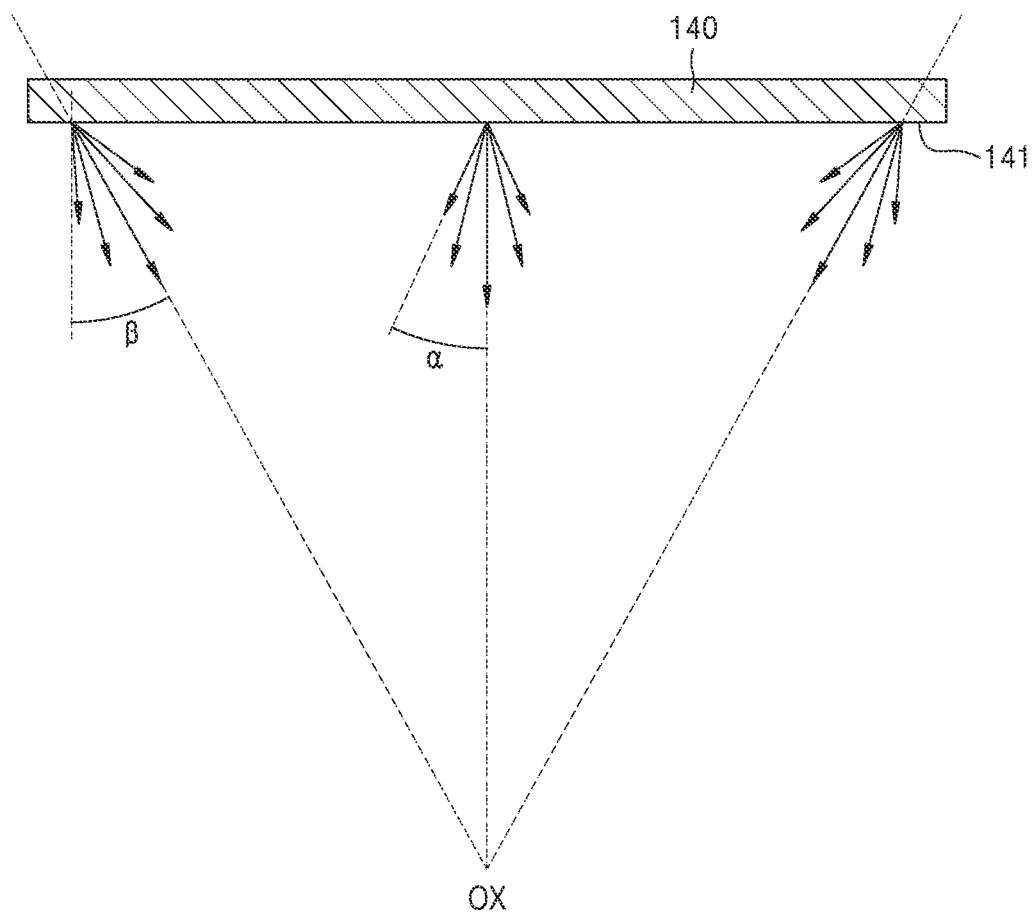
FIG. 4 is a schematic cross-sectional view illustrating an operation of an anisotropic holographic screen of the multi-image display apparatus illustrated in FIG. 1.

In particular, the anisotropic holographic screen 140 may be configured to have different diffusion central angles based on a location of the first surface 141, on which the light is incident. For example, FIG. 4 is a schematic cross-sectional view illustrating an operation of the anisotropic holographic screen 140 of the multi-image display apparatus 100 illustrated in FIG. 1. Referring to FIG. 4, in a central area of the anisotropic holographic screen 140, the diffusion central angle β is approximately 0 degrees with respect to a normal line perpendicular to the first surface 141. For example, in the central area of the anisotropic holographic screen 140, the diffusion central angle β is perpendicular to the first surface 141. Here, the diffusion central angle β is an angle, which is the middle of a range of angles, at which light is reflected and diffused from a point on the first surface 141 of the anisotropic holographic screen 140. A ray reflected and diffused at the diffusion central angle β has the greatest intensity from among rays reflected and diffused from a point on the first surface 141 of the anisotropic holographic screen 140.

Meanwhile, the diffusion central angle β may have a greater inclination with respect to the normal line perpendicular to the first surface 141, as a distance from the center of the first surface 141 of the anisotropic holographic screen 140 increases. Also, as illustrated in FIG. 4, the diffusion central angle β may be symmetrically inclined based on the center of the first surface 141 of the anisotropic holographic screen 140. Thus, the anisotropic holographic screen 140 may be configured such that light reflected/diffused at the central diffusion angle β from all points on the first surface 141 of the anisotropic holographic screen 140 is gathered at any one point on an optical axis OX. For example, the diffusion central angle β may be between about 10 degrees and about 20 degrees at an edge of the first surface 141 of the anisotropic holographic screen 140.

Also, a diffusion angle α at which light is reflected and diffused from any one point on the first surface 141 of the anisotropic holographic screen 140 may be, for example, within about 10 degrees. Here, the diffusion angle α may be defined as an angle between a progression direction of light diffused at a half intensity of an intensity of the light diffused at the diffusion central angle β, and the normal line perpendicular to the first surface 141. According to an example embodiment, the diffusion angle α at which light is reflected and diffused is relatively less, and thus, loss of light may be less. Also, the diffusion central angle β is symmetrically inclined based on the center of the first surface 141 of the anisotropic holographic screen 140, and thus, an angle of view for the first image L10 may be increased.

Figure 5:
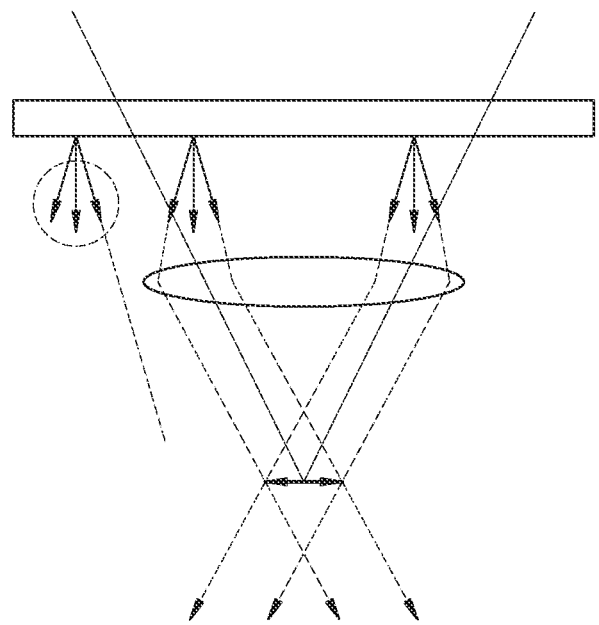
FIGS. 5 and 6 are schematic cross-sectional views illustrating operations of related diffusion screens.
Figure 6:
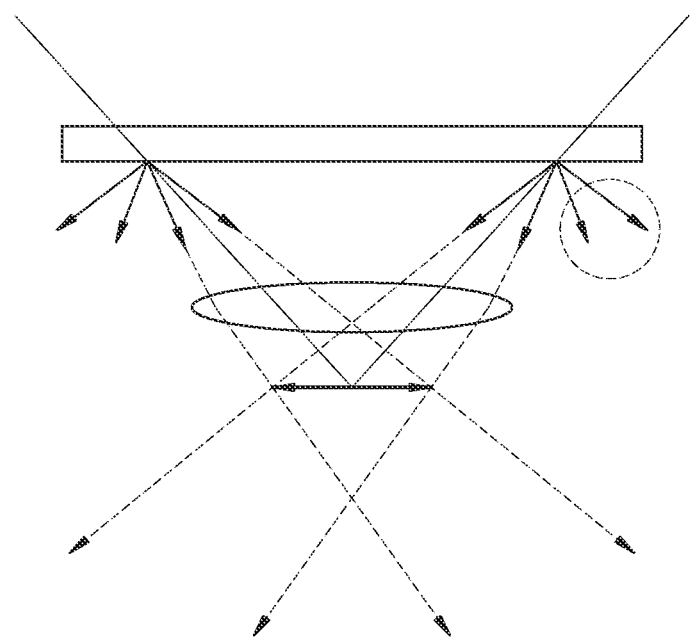

FIGS. 5 and 6 are schematic cross-sectional views illustrating operations of related diffusion screens. First, referring to FIG. 5, the diffusion central angle is constant in all areas of the diffusion screen. Also, the diffusion screen illustrated in FIG. 5 has a relatively small diffusion angle. As illustrated in FIG. 5, when the diffusion screen having a small diffusion angle is observed through a lens, a viewing window through which the first image L10 may be observed may be decreased. Further, as indicated by a dotted-line circle in FIG. 5, light that is far from the center of the diffusion screen does not pass through the lens, and thus, an angle of view for the first image L10 may also be decreased.

Also, referring to FIG. 6, the diffusion central angle is constant in all areas of the diffusion screen. Also, the diffusion screen illustrated in FIG. 6 has a relatively large diffusion angle compared with the diffusion screen illustrated in FIG. 5. As illustrated in FIG. 6, when the diffusion screen having a large diffusion angle is observed through a lens, a viewing window through which the first image L10 may be observed may be increased. However, when the diffusion angle of the diffusion screen is increased, a degree of transmittance is decreased so that the second image L20 may be darkened. Also, as indicated by a dotted-line circle in FIG. 6, light diffused toward the outside of the diffusion screen from an area far from the center of the diffusion screen does not pass through the lens, and thus, due to loss of the light, the first image L10 may also be darkened.

However, according to the example embodiment, by using the anisotropic holographic screen 140 having different diffusion central angles β based on locations of the anisotropic holographic screen 140, the angle of view for the first image L10 may be increased. For example, when the diffusion central angle β at both ends of the anisotropic holographic screen 140 is 15 degrees, an angle of view of about 90 degrees may be obtained. Also, since the diffusion angle α of the anisotropic holographic screen 140 is about 10 degrees, which is relatively small, the loss of light may be decreased to increase the brightness of the first and second images L10 and L20. Thus, the multi-image display apparatus 100 described above may reduce a difference between the angle of view of the multi-image display apparatus 100 and an actual external scene, thereby providing a more realistic AR experience. Also, the polarization selective lens 160 and the anisotropic holographic screen 140 may be arranged in front of a user's eye without a relay optical system, and thus, the size of the multi-image display apparatus 100 may be reduced.

Figure 7:
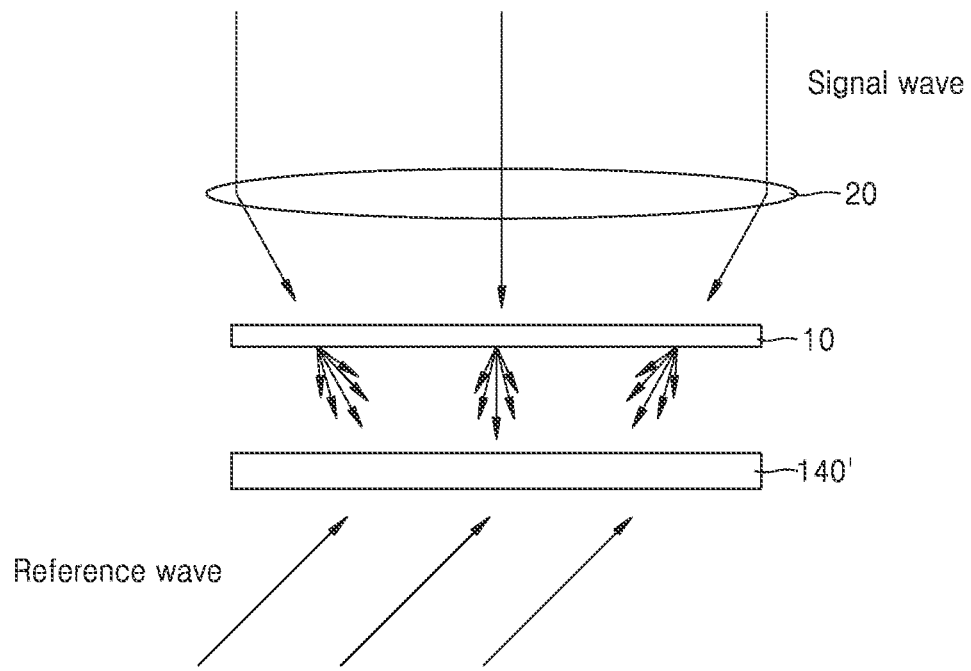
FIGS. 7 through 10 are schematic views illustrating a configuration for manufacturing an anisotropic holographic screen of the multi-image display apparatus illustrated in FIG. 1.

FIG. 7 is a schematic view illustrating a configuration for manufacturing the anisotropic holographic screen 140 of the multi-image display apparatus 100 illustrated in FIG. 1. Referring to FIG. 7, a transparent diffusion plate 10 is arranged above an upper surface of a photosensitive member 140' and a convex lens 20 is arranged above the transparent diffusion plate 10. Thereafter, reference waves are slantly irradiated toward a lower surface of the photosensitive member 140' at an angle from a direction normal to the lower surface, and signal waves are perpendicularly irradiated onto the convex lens 20. Then, the signal waves are focused by the convex lens 20 and diffused by the transparent diffusion plate 10. Thus, while the signal waves have a directionality of being focused by the convex lens 20, the signal waves are diffused by the transparent diffusion plate 10 and incident into the photosensitive member 140'.

Here, the reference waves and the signal waves have the same wavelength. For example, light generated from one light source may be split by a beam splitter to be provided as each of reference waves and signal waves. Then, interference patterns generated when the signal waves and the reference waves interfere with each other may be recorded in the photosensitive member 140'. When the photosensitive member 140' in which the interference patterns are recorded is developed, the anisotropic holographic screen 140 performing the operation illustrated in FIG. 4 may be formed.

Referring to FIG. 1, the multi-image display apparatus 100 may be configured such that the first image L10 is slantly incident into the first surface 141 of the anisotropic holographic screen 140 at an angle with respect to the direction normal to the first surface. The anisotropic holographic screen 140 may operate as a reflection diffusion plate only for light incident at the same angle as the reference waves illustrated in FIG. 7 and may transmit other light without change and distortion. Thus, when the anisotropic holographic screen 140 is manufactured, the multi-image display apparatus 100 may be configured such that the first image L10 is incident into the first surface 141 of the anisotropic holographic screen 140 at the same incident angle as the reference waves. Then, after the first image L10 is reflected and diffused by the anisotropic holographic screen 140, the first image L10 is focused by the polarization selective lens 160. The second image L20 perpendicularly incident into the second surface 142 of the anisotropic holographic screen 140 may pass through the anisotropic holographic screen 140 and the polarization selective lens 160 without change and distortion.

Figure 9:
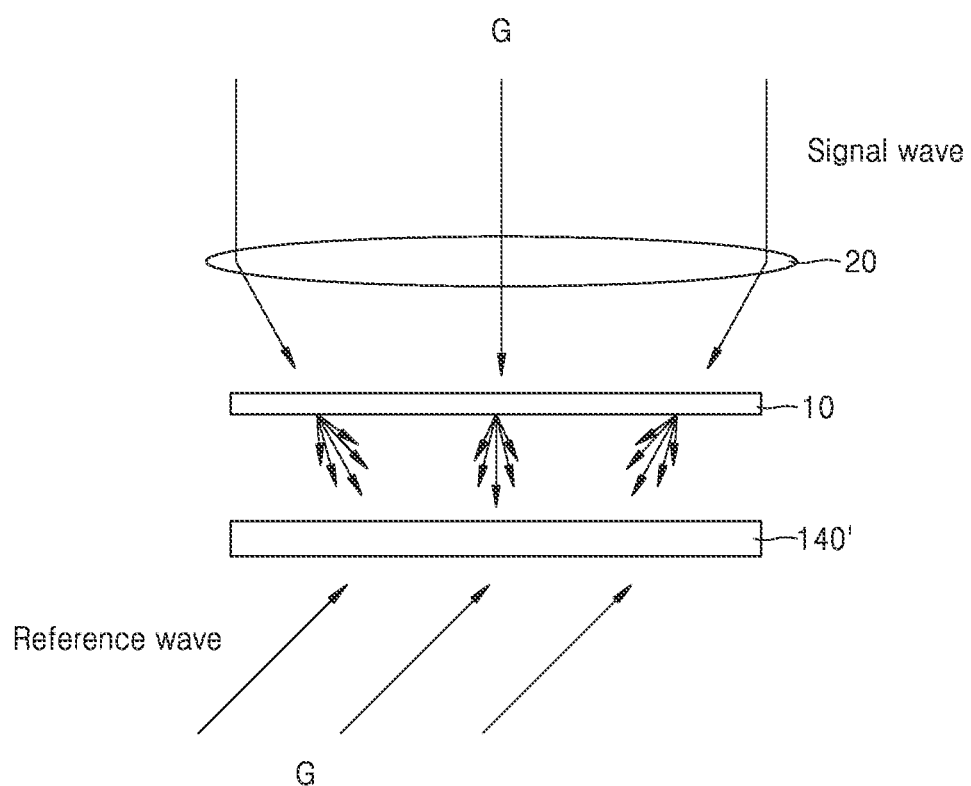
Figure 10:
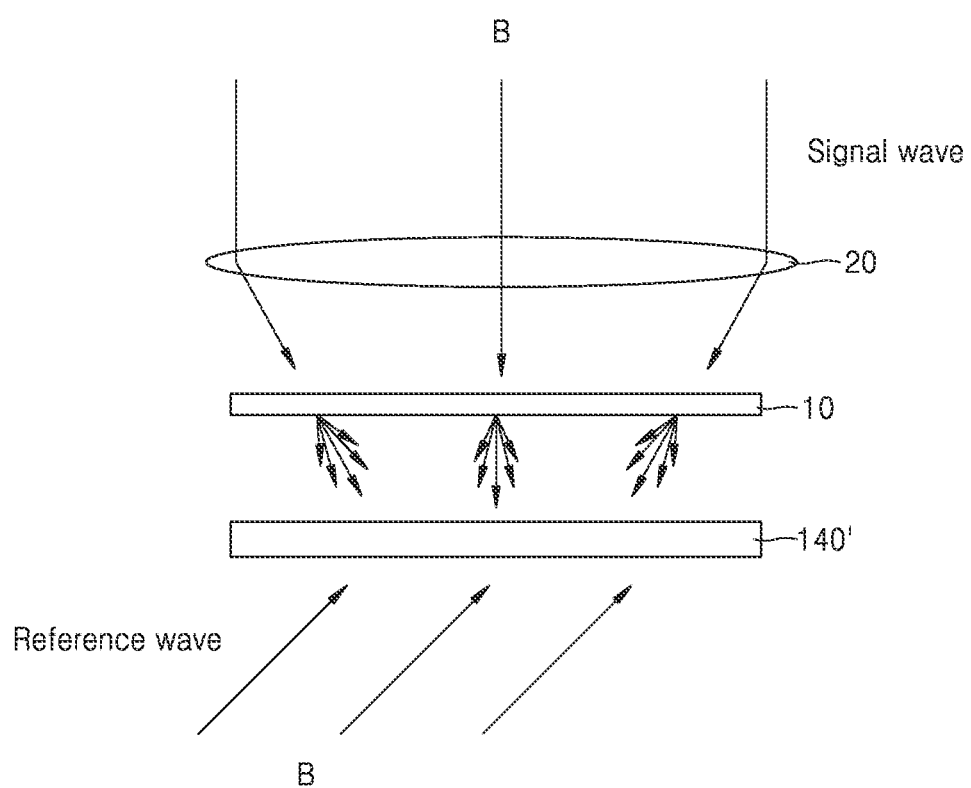

Meanwhile, the anisotropic holographic screen 140 may operate as the reflection diffusion plate only for light having the same wavelength as the reference waves and the signal waves used for manufacturing the anisotropic holographic screen 140. Thus, when the first image L10 has a red image, a green image, and a blue image, all operations described with reference to FIG. 7 may be performed with respect to the three wavelength ranges. For example, FIGS. 8 through 10 are schematic views illustrating a configuration for manufacturing the anisotropic holographic screen 140 when the first image L10 has the red image, the green image, and the blue image.

Figure 8:
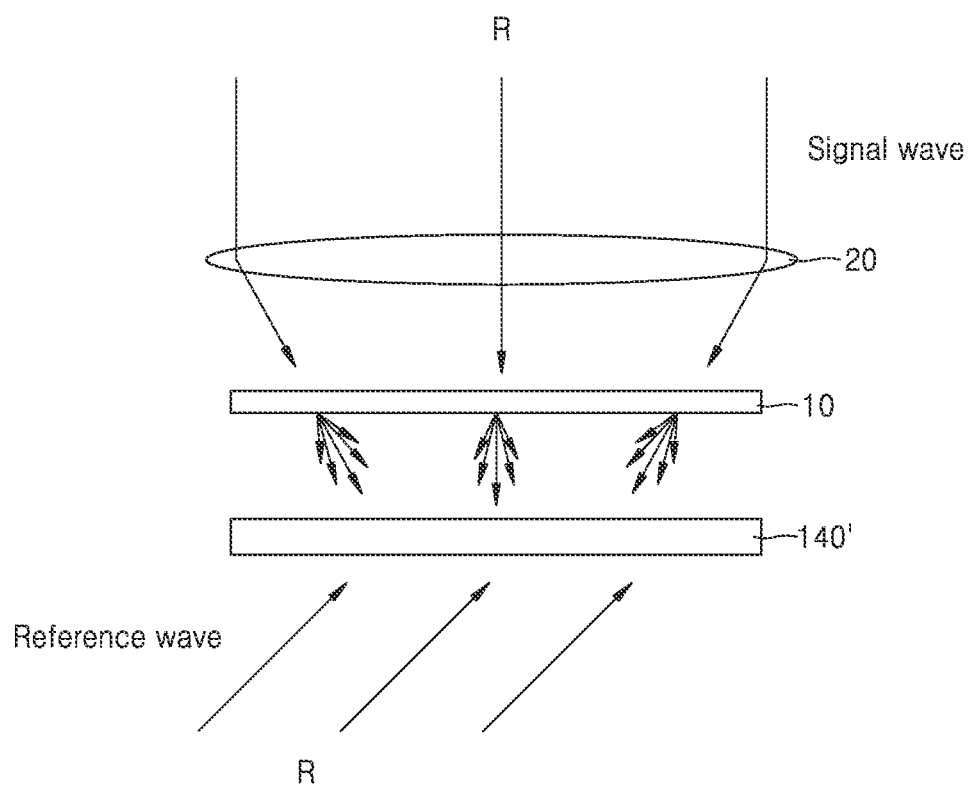

First, as illustrated in FIG. 8, reference waves of a red wavelength range are slantly irradiated toward the lower surface of the photosensitive member 140' and signal waves of the red wavelength range are perpendicularly irradiated onto the convex lens 20. Then, interference patterns generated due to the signal waves of the red wavelength range and the reference waves of the red wavelength range interfering with each other are recorded in the photosensitive member 140'. Then, as illustrated in FIG. 9, reference waves of a green wavelength range are slantly irradiated toward the lower surface of the photosensitive member 140' and signal waves of the green wavelength range are perpendicularly irradiated onto the convex lens 20, and interference patterns generated due to the signal waves of the green wavelength range and the reference waves of the green wavelength range interfering with each other are recorded in the photosensitive member 140'. Also, as illustrated in FIG. 10, reference waves of a blue wavelength range are slantly irradiated toward the lower surface of the photosensitive member 140' and signal waves of the blue wavelength range are perpendicularly irradiated onto the convex lens 20, and interference patterns generated due to the signal waves of the blue wavelength range and the reference waves of the blue wavelength range interfering with each other are recorded in the photosensitive member 140'. Thereafter, the photosensitive member 140' may be developed to form the anisotropic holographic screen 140. Here, the order in which the reference waves and the signal waves of each of the red, green, and blue wavelength ranges are irradiated may be arbitrarily selected. Angles at which the reference waves of the red wavelength range, the reference waves of the green wavelength range, and the reference waves of the blue wavelength range are incident toward the lower surface of the photosensitive member 140' may be the same.

Figure 11:
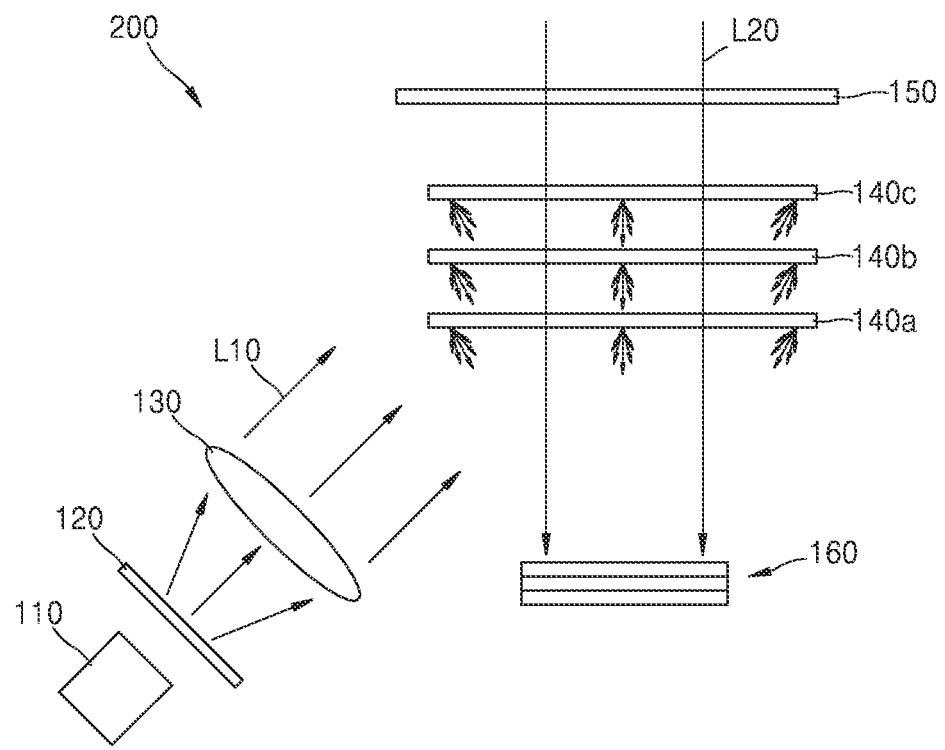
FIG. 11 is a schematic view illustrating a configuration of a multi-image display apparatus according to an example embodiment.

FIG. 11 is a schematic view illustrating a configuration of a multi-image display apparatus 200 according to an example embodiment. Referring to FIG. 11, the multi-image display apparatus 200 may include a first wavelength-selective anisotropic holographic screen 140a, a second wavelength-selective anisotropic holographic screen 140b, and a third wavelength-selective anisotropic holographic screen 140c that are sequentially arranged. Other aspects of the multi-image display apparatus 200 are the same as the aspects of the multi-image display apparatus 100 illustrated in FIG. 1.

The first wavelength-selective anisotropic holographic screen 140a, the second wavelength-selective anisotropic holographic screen 140b, and the third wavelength-selective anisotropic holographic screen 140c may operate as screens for light of different wavelengths. For example, the first wavelength-selective anisotropic holographic screen 140a may reflect and diffuse light of a red wavelength and transmit light of other wavelengths. The second wavelength-selective anisotropic holographic screen 140b may reflect and diffuse light of a green wavelength and transmit light of other wavelengths. The third wavelength-selective anisotropic holographic screen 140c may reflect and diffuse light of a blue wavelength and transmit light of other wavelengths.

Thus, a red image of the first image L10 provided by the image forming device 110 is reflected and diffused by the first wavelength-selective anisotropic holographic screen 140a. A green image passes through the first wavelength-selective anisotropic holographic screen 140a, and then is reflected and diffused by the second wavelength-selective anisotropic holographic screen 140b. A blue image passes through the first wavelength-selective anisotropic holographic screen 140a and the second wavelength-selective anisotropic holographic screen 140b, and then is reflected and diffused by the third wavelength-selective anisotropic holographic screen 140c. Thereafter, the red image, the green image, and the blue image of the first image L10 are focused by the polarization selective lens 160. The second image L20 passes through all of the first wavelength-selective anisotropic holographic screen 140a, the second wavelength-selective anisotropic holographic screen 140b, and the third wavelength-selective anisotropic holographic screen 140c, and then passes through the polarization selective lens 160.

Figure 12:
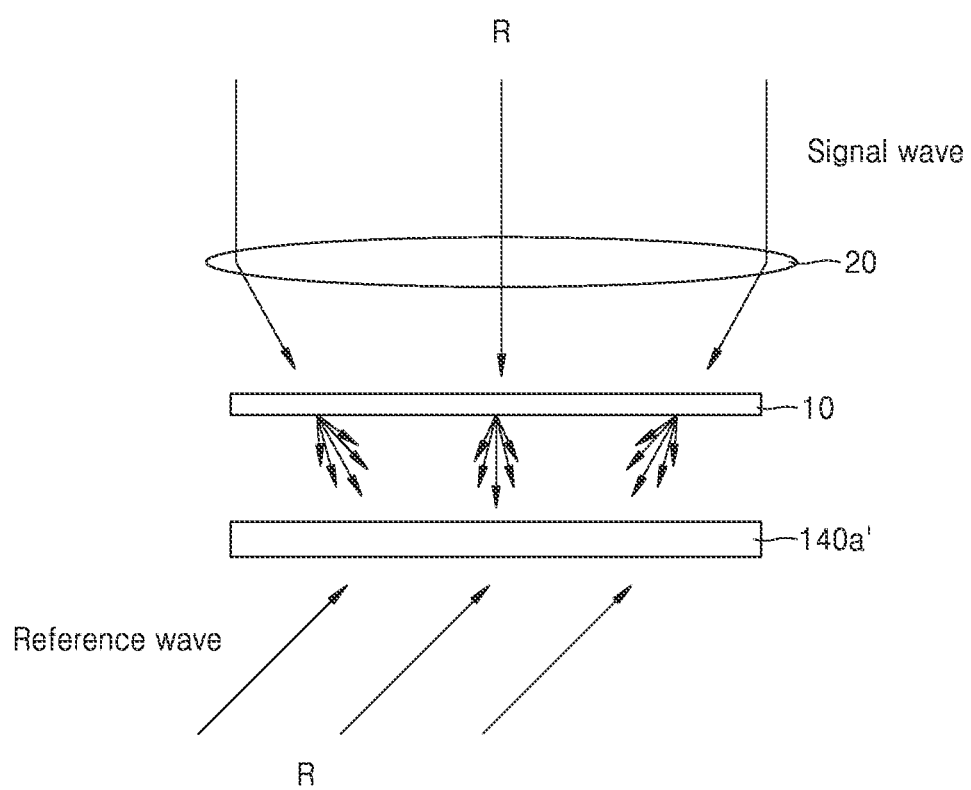
FIGS. 12 through 14 are schematic views illustrating a configuration for manufacturing wavelength-selective anisotropic holographic screens of the multi-image display apparatus illustrated in FIG. 11.
Figure 13:
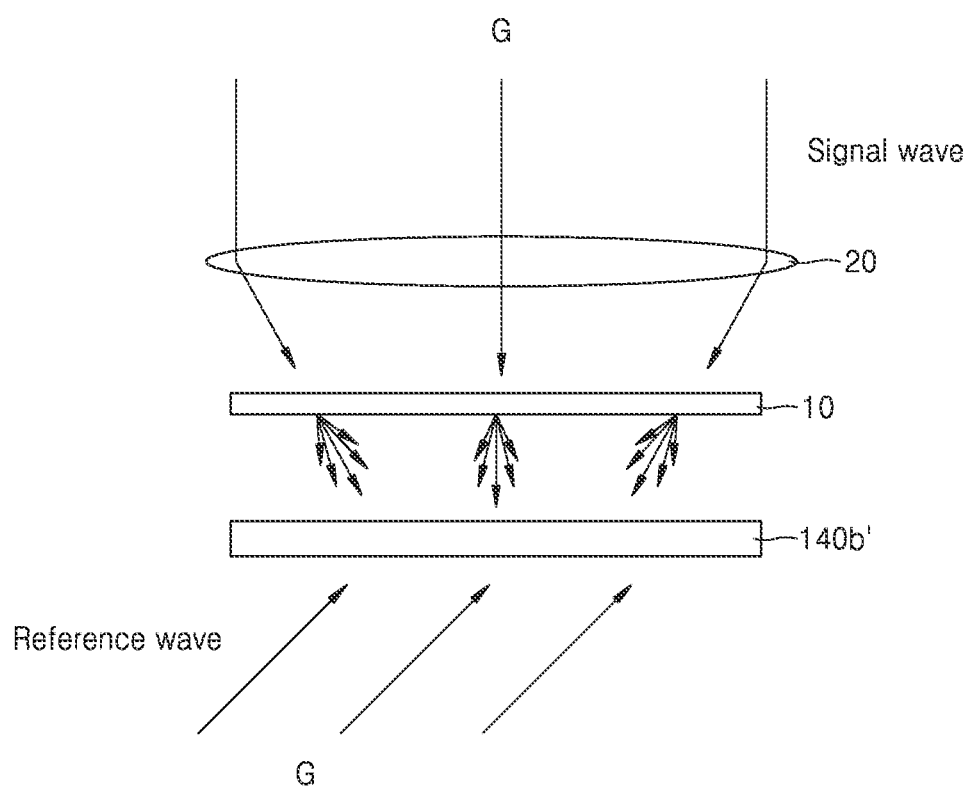
Figure 14:
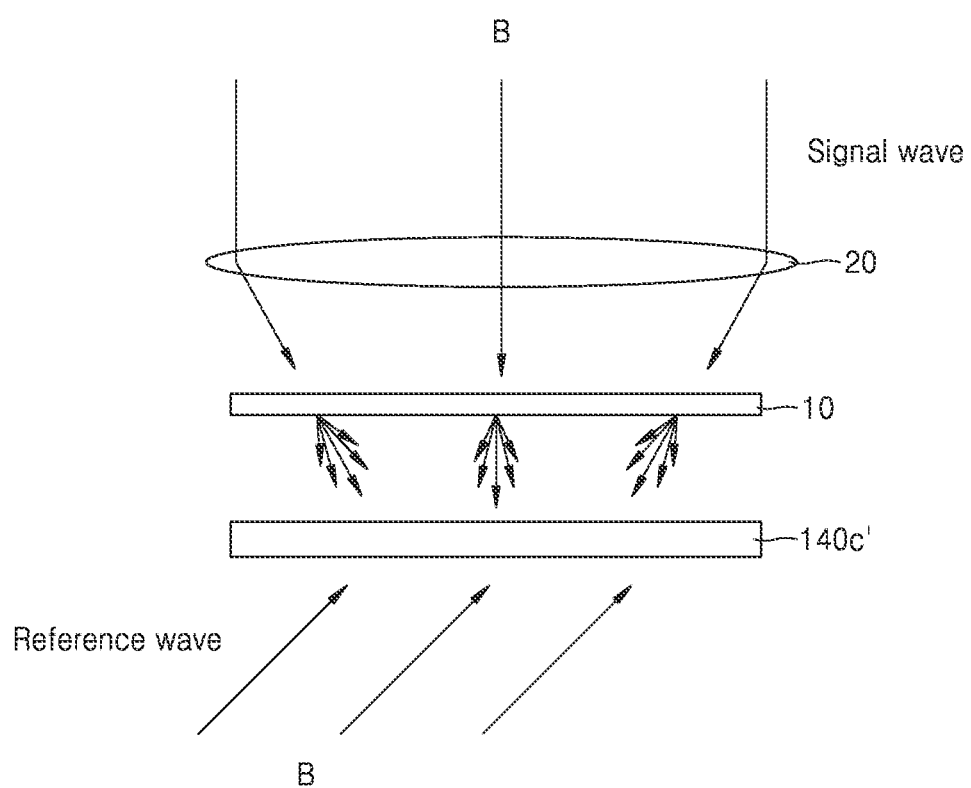

FIGS. 12 through 14 are schematic views illustrating a configuration for manufacturing the first wavelength-selective anisotropic holographic screen 140a, the second wavelength-selective anisotropic holographic screen 140b, and the third wavelength-selective anisotropic holographic screen 140c of the multi-image display apparatus 100 illustrated in FIG. 11. First, referring to FIG. 12, reference waves of a red wavelength range are slantly irradiated toward the lower surface of a first photosensitive member 140a' and signal waves of the red wavelength range are perpendicularly irradiated onto the convex lens 20. Also, interference patterns that are generated when the signal waves of the red wavelength range and the reference waves of the red wavelength range interfere with each other are recorded in the first photosensitive member 140a'. Thereafter, the first photosensitive member 140a' may be developed to form the first wavelength-selective anisotropic holographic screen 140a.

Also, referring to FIG. 13, reference waves of a green wavelength range are slantly irradiated toward a lower surface of a second photosensitive member 140b' and signal waves of the green wavelength range are perpendicularly irradiated onto the convex lens 20. Also, interference patterns that are generated when the signal waves of the green wavelength range and the reference waves of the green wavelength range interfere with each other are recorded in the second photosensitive member 140b'. Thereafter, the second photosensitive member 140b' may be developed to form the second wavelength-selective anisotropic holographic screen 140b.

Lastly, referring to FIG. 14, reference waves of a blue wavelength range are slantly irradiated toward a lower surface of a third photosensitive member 140c' and signal waves of the blue wavelength range are perpendicularly irradiated onto the convex lens 20. Also, interference patterns that are generated when the signal waves of the blue wavelength range and the reference waves of the blue wavelength range interfere with each other are recorded in the third photosensitive member 140c'. Thereafter, the third photosensitive member 140c' may be developed to form the third wavelength-selective anisotropic holographic screen 140c.

In FIGS. 12 through 14, all of an angle at which the reference waves of the red wavelength range are incident toward the lower surface of the first photosensitive member 140a', an angle at which the reference waves of the green wavelength range are incident toward the lower surface of the second photosensitive member 140b', and an angle at which the reference waves of the blue wavelength range are incident toward the lower surface of the third photosensitive member 140c' may be the same. Also, the first image L10 may be incident onto each of the first wavelength-selective anisotropic holographic screen 140a, the second wavelength-selective anisotropic holographic screen 140b, and the third wavelength-selective anisotropic holographic screen 140c at the same incident angle as these reference waves.

The first wavelength-selective anisotropic holographic screen 140a, the second wavelength-selective anisotropic holographic screen 140b, and the third wavelength-selective anisotropic holographic screen 140c may be arranged to offset or reduce chromatic aberration of the polarization selective lens 160. In general, the geometric phase lenses 160a and 160c of the polarization selective lens 160 are realized by forming patterns of a plurality of nonlinear material elements on a transparent substrate, whereby the polarization selective lens 160 may have chromatic aberration due to dispersion based on the wavelengths. Unlike a general refractive lens having a focal distance that is proportional to the wavelength, the polarization selective lens 160 using diffraction has a focal distance that is inversely proportional to the wavelength of light. That is, as the wavelength of incident light is increased, the focal distance of the polarization selective lens 160 is decreased, and the focal distance of the polarization selective lens 160 is sensitively changed as the wavelength is changed. For example, the polarization selective lens 160 may have a first focal distance for a red image, a second focal distance that is greater than the first focal distance for a green image, and a third focal distance that is greater than the second focal distance for a blue image.

According to the example embodiment, the chromatic aberration of the polarization selective lens 160 may be offset by allowing each of the red image, the green image, and the blue image to have a different optical path length by placing the first wavelength-selective anisotropic holographic screen 140a, the second wavelength-selective anisotropic holographic screen 140b, and the third wavelength-selective anisotropic holographic screen 140c on different locations of the optical path. For example, the first wavelength-selective anisotropic holographic screen 140a, the second wavelength-selective anisotropic holographic screen 140b, and the third wavelength-selective anisotropic holographic screen 140c may be sequentially arranged away from the polarization selective lens 160. Then, the red image may have a first optical path length, the green image may have a second optical path length that is greater than the first optical path length, and the blue image may have a third optical path length that is greater than the second optical path length. To this end, the locations of the first wavelength-selective anisotropic holographic screen 140a, the second wavelength-selective anisotropic holographic screen 140b, and the third wavelength-selective anisotropic holographic screen 140c may be selected by taking into account chromatic aberration of the polarization selective lens 160 to offset the chromatic aberration.

Figure 15:
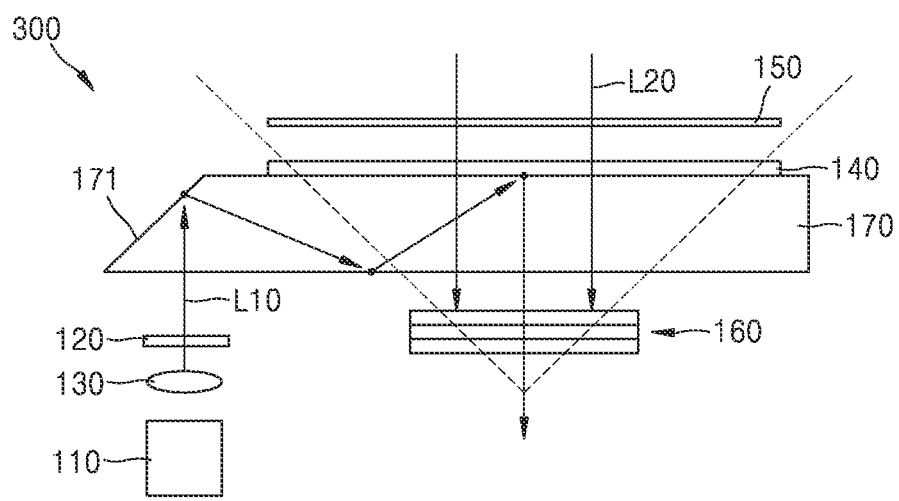
FIG. 15 is a schematic view illustrating a configuration of a multi-image display apparatus according to an example embodiment.

FIG. 15 is a schematic view illustrating a configuration of a multi-image display apparatus 300 according to an example embodiment. Referring to FIG. 15, the multi-image display apparatus 300 further includes a light guide plate 170 arranged between the anisotropic holographic screen 140 and the polarization selective lens 160. The light guide plate 170 may include an input coupler 171 configured to slantly reflect incident light and provide the incident light into the light guide plate 170. By using the light guide plate 170, a light path may be more easily curved in a small space and it may be possible to transmit light into a small space, and thus, the total size of the multi-image display apparatus 300 may further be decreased.

According to the example embodiment of the multi-image display apparatus 300 illustrated in FIG. 15, the first image L10 generated in the image forming device 110 may be provided to the anisotropic holographic screen 140 through the light guide plate 170. To this end, the collimating lens 130 is arranged to provide the first image L10 to the input coupler 171 of the light guide plate 170. The first image L10 slantly provided into the light guide plate 170 by the input coupler 171 may be totally reflected from an upper surface and a lower surface of the light guide plate 170 and may travel in the light guide plate 170. In this process, a portion of the first image L10 incident into the upper surface of the light guide plate 170 may be reflected and diffused by the anisotropic holographic screen 140 and may be incident into the polarization selective lens 160. To this end, the anisotropic holographic screen 140 may be arranged to directly contact the upper surface of the light guide plate 170. The second image L20 passes through all of the anisotropic holographic screen 140, the light guide plate 170, and the polarization selective lens 160. In the example of FIG. 15, the angle at which the input coupler 171 provides the incident light into the light guide plate 170 is selected to be the same as an incident angle of the reference waves for manufacturing the anisotropic holographic screen 140.

Figure 16A:
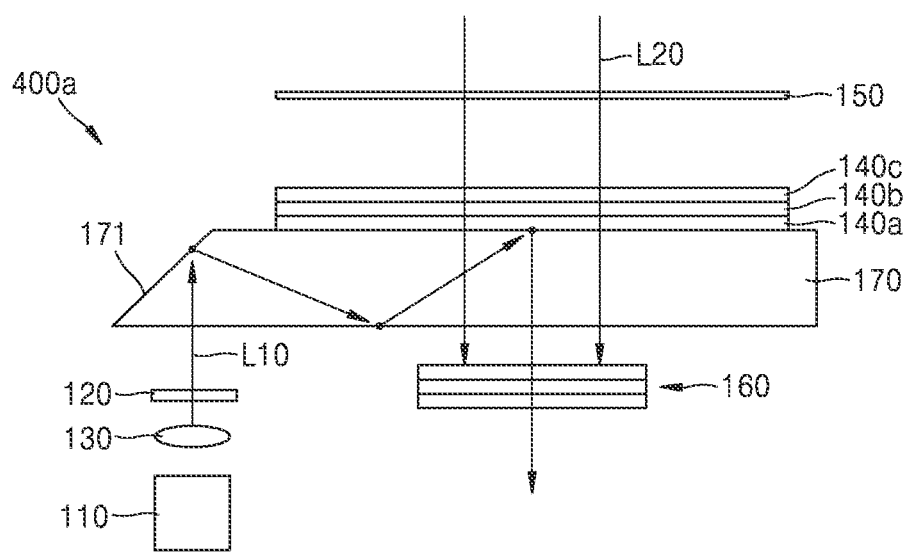
FIGS. 16A and 16B are schematic views illustrating a configuration of a multi-image display apparatus according to an example embodiment.

FIG. 16A is a schematic view illustrating a configuration of a multi-image display apparatus 400a according to an example embodiment. Referring to FIG. 16A, the multi-image display apparatus 400a may include the first wavelength-selective anisotropic holographic screen 140a, the second wavelength-selective anisotropic holographic screen 140b, and the third wavelength-selective anisotropic holographic screen 140c that are sequentially arranged. Other aspects of the multi-image display apparatus 400a are the same as the aspects of the multi-image display apparatus 300 illustrated in FIG. 15. Also, the configuration and operation of the first wavelength-selective anisotropic holographic screen 140a, the second wavelength-selective anisotropic holographic screen 140b, and the third wavelength-selective anisotropic holographic screen 140c may be the same as the configuration and operation according to the example embodiments described with reference to FIGS. 11 through 14.

Figure 16B:
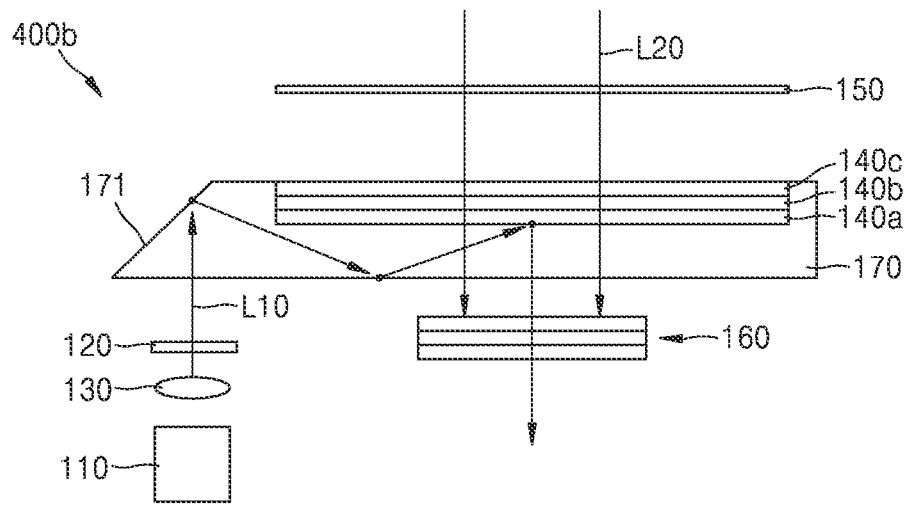

Also, FIG. 16B is a schematic view illustrating a configuration of a multi-image display apparatus 400b according to an example embodiment. Referring to FIG. 16B, the first wavelength-selective anisotropic holographic screen 140a, the second wavelength-selective anisotropic holographic screen 140b, and the third wavelength-selective anisotropic holographic screen 140c may be located in the light guide plate 170. Other aspects of the multi-image display apparatus 400b may be the same as the aspects of the multi-image display apparatus 400a illustrated in FIG. 16A. FIG. 16B illustrates that an upper surface of the third wavelength-selective anisotropic holographic screen 140c arranged on the uppermost region and the upper surface of the light guide plate 170 correspond to each other. However, all of the first wavelength-selective anisotropic holographic screen 140a, the second wavelength-selective anisotropic holographic screen 140b, and the third wavelength-selective anisotropic holographic screen 140c may be completely buried in the light guide plate 170.

Figure 17:
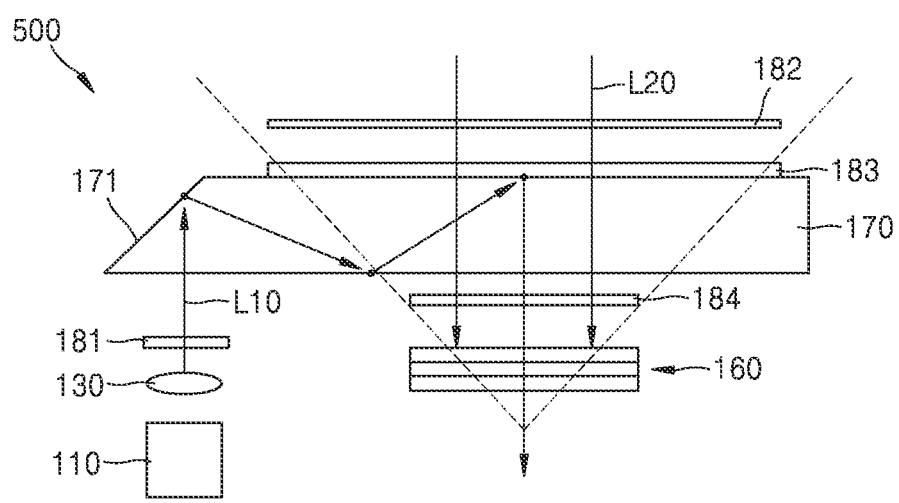
FIG. 17 is a schematic view illustrating a configuration of a multi-image display apparatus according to an example embodiment.

FIG. 17 is a schematic view illustrating a configuration of a multi-image display apparatus 500 according to an example embodiment. Referring to FIG. 17, the multi-image display apparatus 500 according to the example embodiment may include the image forming device 110 configured to form the first image L10, a polarization selective screen 183 configured to reflect and diffuse the first image L10 and transmit the second image L20, the light guide plate 170 configured to provide the first image L10 to the polarization selective screen 183, and the polarization selective lens 160 configured to focus the first image L10 and transmit the second image L20 without refraction. Also, the multi-image display apparatus 500 may further include the collimating lens 130 configured to collimate the first image L10 formed by the image forming device 110 and provide the first image L10 to the input coupler 171 of the light guide plate 170.

Figure 18:
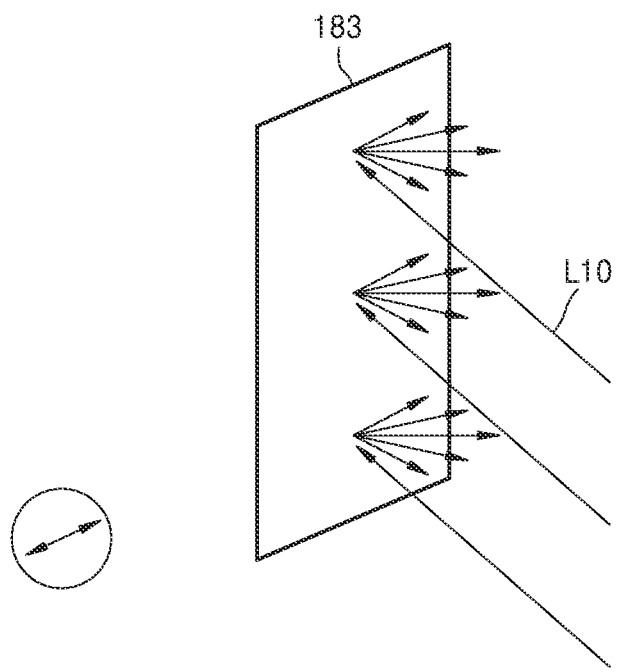
FIGS. 18 and 19 are schematic views illustrating an operation of a polarization selective screen illustrated in FIG. 17.
Figure 19:
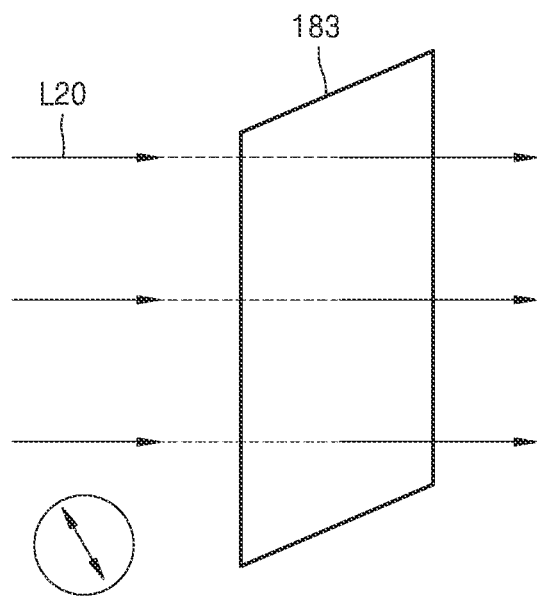

According to the example embodiment, the polarization selective screen 183 is configured to operate as a diffusion plate or a transparent flat plate based on a linear polarization direction of incident light. For example, FIGS. 18 and 19 are schematic views illustrating an operation of the polarization selective screen 183 illustrated in FIG. 17. First, referring to FIG. 18, the polarization selective screen 183 may reflect and diffuse the first image L10 having a first linear polarization component. Also, referring to FIG. 19, the polarization selective screen 183 may transmit the second image L20 having a second linear polarization component perpendicular to the first linear polarization component.

To this end, the multi-image display apparatus 500 may further include a first linear polarization plate 181 configured to transmit only light having the first linear polarization component and a second linear polarization plate 182 configured to transmit only light having the second liner polarization component. The first linear polarization plate 181 is arranged on a light path of the first image L10 that is between the image forming device 110 and the light guide plate 170, so that the first image L10 has the first linear polarization component. The second linear polarization plate 182 is arranged to face a surface of the polarization selective screen 183, on which the second image L20 is incident, so that the second image L20 has the second linear polarization component.

Also, the polarization selective lens 160 focuses the incident light or transmits the incident light without refraction according to a circular polarization state of the incident light, and thus, the multi-image display apparatus 500 may further include a ¼ wavelength plate 184 arranged between the light guide plate 170 and the polarization selective lens 160. Then, a phase of the first image L10 having the first linear polarization component is delayed by a ¼ wavelength by the ¼ wavelength plate 184, and thus, the first image L10 incident into the polarization selective lens 160 may have the first circular polarization component. Also, a phase of the second image L20 having the second linear polarization component is delayed by a ¼ wavelength by the ¼ wavelength plate 184, and thus, the second image L20 incident into the polarization selective lens 160 may have the second circular polarization component.

Figure 20:
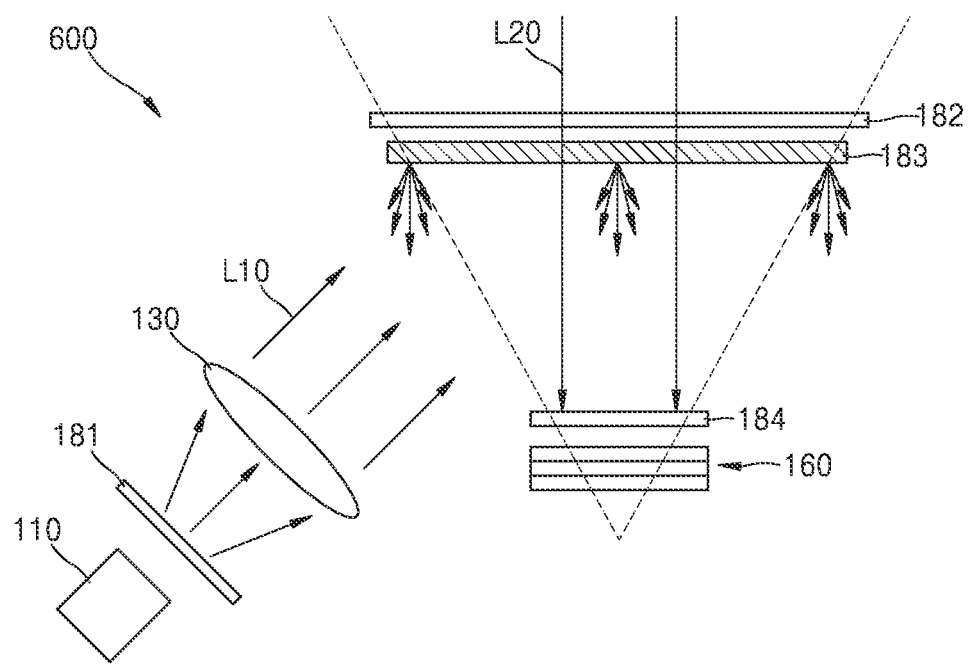
FIG. 20 is a schematic view illustrating a configuration of a multi-image display apparatus according to an example embodiment.

FIG. 20 is a schematic view illustrating a configuration of a multi-image display apparatus 600 according to an example embodiment. The multi-image display apparatus 600 includes a first linear polarization plate 181 and a second linear polarization plate 184. Also, the multi-image display apparatus 600 includes the polarization selective screen 183 configured to reflect and diffuse the first image L10 having the first linear polarization component and to intactly transmit the second image L20 having the second linear polarization component without change. Also, the multi-image display apparatus 600 further includes the ¼ wavelength plate 184 arranged between the polarization selective screen 183 and the polarization selective lens 160.

Also, in the multi-image display apparatus 100 illustrated in FIG. 1, the first circular polarization plate 120 and the second circular polarization plate 150 may be replaced by the first linear polarization plate 181 and the second linear polarization plate 184. Also, the multi-image display apparatus 100 may be configured to further include the ¼ wavelength plate 184 between the anisotropic holographic screen 140 and the polarization selective lens 160.

Figure 21:
FIGS. 21 through 23 are views illustrating various electronic devices to which a multi-image display apparatus is applicable according to example embodiments.
Figure 22:
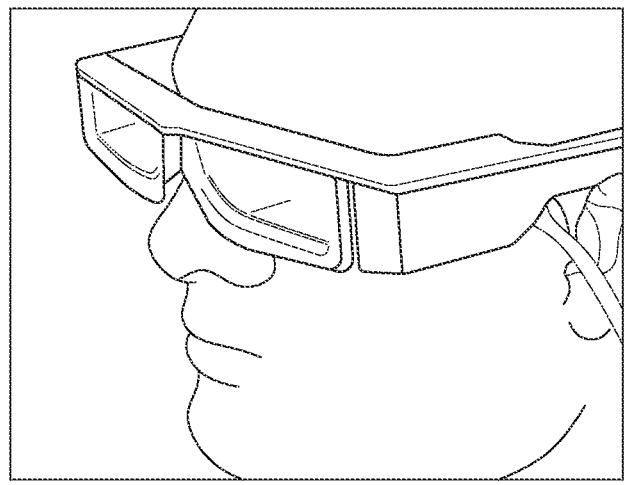
Figure 23:
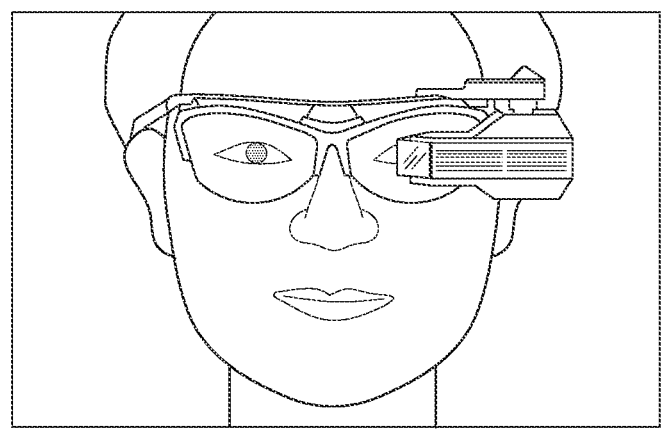

FIGS. 21 through 23 illustrate various electronic devices to which the multi-image display apparatuses according to example embodiments described above are applicable. As illustrated in FIGS. 21 through 23, at least one of the multi-image display apparatuses of the example embodiments may constitute wearable devices. For example, the multi-image display apparatuses may be applied to wearable devices. For example, the multi-image display apparatuses may be applied to head mounted displays (HMDs). In addition, the multi-image display apparatuses may be applied to glasses-type displays or goggle-type displays. The wearable electronic devices shown in FIGS. 21 through 23 may be operated in an interacting relationship with smartphones.

In addition, the multi-image display apparatuses of the example embodiments may be included in smartphones, and the smart phones may be used as multi-image display apparatuses. For example, the multi-image display apparatuses may be applied to compact electronic devices or mobile electronic devices. The application fields of the multi-image display apparatuses of the example embodiments may vary in various ways. For example, the multi-image display apparatuses of the example embodiments may be not only used to implement AR or MR, but also used in other fields. For example, the technical concepts of the example embodiments may be applied not only to AR or MR, but also to displays through which a plurality of images may be simultaneously seen.

It should be understood that the multi-image display apparatuses including the polarization selective lens and the screen described according to example embodiments should be considered in a descriptive sense only and not for purposes of limitation. Descriptions of features or aspects within each example embodiment should typically be considered as available for other similar features or aspects in other example embodiments. While example embodiments have been described with reference to the figures, it will be understood by those of ordinary skill in the art that various changes in form and details may be made therein without departing from the spirit and scope as defined by the following claims.

What is claimed is:

1. A multi-image display apparatus comprising:
an image forming device configured to form an image;
a first polarization plate configured to transmit a first polarization component of the image provided from the image forming device;
a second polarization plate configured to transmit a second polarization component of external light that is provided from a path different from the image, the second polarization component being different from the first polarization component;
a screen configured to reflect and diffuse the image, and transmit the external light;
a polarization selective lens configured to focus the image having the first polarization component, and transmit the external light having the second polarization component without refraction; and
a light guide plate disposed between the screen and the polarization selective lens,
wherein the light guide plate is configured to provide the image coming from the image forming device to the screen through total reflection.

2. The multi-image display apparatus of claim 1, wherein the screen comprises a first surface and a second surface that is opposite to the first surface, and
wherein the screen further comprises an anisotropic holographic screen configured to reflect and diffuse light that is incident on the first surface at an angle, and transmit light incident on the second surface.

3. The multi-image display apparatus of claim 2, wherein the image forming device is disposed to provide the image to the first surface of the screen at an angle.

4. The multi-image display apparatus of claim 2, wherein the second polarization plate is disposed on the second surface of the screen.

5. The multi-image display apparatus of claim 2, wherein the screen is configured such that a diffusion central angle is 0 degrees from a normal line perpendicular to the first surface in a central area of the first surface, and the diffusion central angle increases from the normal line perpendicular to the first surface from the central area of the first surface to edge areas of the first surface.

6. The multi-image display apparatus of claim 5, wherein the screen is configured such that the diffusion central angle is symmetrically inclined based on the central area of the first surface, and light reflected and diffused at the diffusion central angle from the first surface are gathered on a point of an optical axis.

7. The multi-image display apparatus of claim 5, wherein the diffusion central angle ranges from 10 degrees to 20 degrees at an edge of the first surface.

8. The multi-image display apparatus of claim 5, wherein a diffusion angle at which light is reflected and diffused from the first surface is within 10 degrees.

9. A multi-image display apparatus comprising:
an image forming device configured to form an image;

a first polarization plate configured to transmit a first polarization component of the image provided from the image forming device;

a second polarization plate configured to transmit a second polarization component of external light that is provided from a path different from the image, the second polarization component being different from the first polarization component;

a screen configured to reflect and diffuse the image, and transmit the external light;

a polarization selective lens configured to focus the image having the first polarization component, and transmit the external light having the second polarization component without refraction; and a light guide plate disposed between the screen and the polarization selective lens, wherein the image comprises a first color image, a second color image, and a third color image, and wherein the screen comprises:

a first anisotropic holographic screen configured to reflect and diffuse the first color image that is incident on a first surface of the first anisotropic holographic screen at an angle, and transmit light incident on a second surface of the first anisotropic holographic screen that is opposite to the first surface;

a second anisotropic holographic screen configured to reflect and diffuse the second color image that is incident on a third surface of the second anisotropic holographic screen at an angle, and transmit light incident on a fourth surface of the second anisotropic holographic screen that is opposite to the third surface; and a third anisotropic holographic screen configured to reflect and diffuse the third color image that is incident on a fifth surface of the third anisotropic holographic screen at an angle, and transmit light incident on a sixth surface of the third anisotropic holographic screen that is opposite to the fifth surface.

10. The multi-image display apparatus of claim 9, wherein the image forming device is configured to provide the first color image to the first surface of the first anisotropic holographic screen at an angle, provide the second color image to the third surface of the second anisotropic holographic screen at an angle, and provide the third color image to the fifth surface of the third anisotropic holographic screen at an angle.

11. The multi-image display apparatus of claim 9, wherein the first anisotropic holographic screen is configured to transmit the second color image and the third color image incident on the first surface, the second anisotropic holographic screen is configured to transmit the first color image and the third color image incident on the third surface, and the third anisotropic holographic screen is configured to transmit the first color image and the second color image incident on the fifth surface.

12. The multi-image display apparatus of claim 9, wherein the first anisotropic holographic screen is configured such that a diffusion central angle of the first color image is 0 degrees from a normal line perpendicular to the first surface, in a central area of the first surface, and the diffusion central angle of the first color image from the normal line perpendicular to the first surface increases from the central area of the first surface to edge areas of the first surface, the second anisotropic holographic screen is configured such that a diffusion central angle of the second color image is 0 degrees from a normal line perpendicular to the third surface in a central area of the third surface, and the diffusion central angle of the second color image from the normal line perpendicular to the third surface increases from the central area of the third surface to edge areas of the third surface, and the third anisotropic holographic screen is configured such that a diffusion central angle of the third color image is 0 degrees from a normal line perpendicular to the fifth surface in a central area of the fifth surface, and the diffusion central angle of the third color image from the normal line perpendicular to the fifth surface increases from the central area of the fifth surface to edge areas of the fifth surface.

13. The multi-image display apparatus of claim 9, wherein the first anisotropic holographic screen, the second anisotropic holographic screen, and the third anisotropic holographic screen are sequentially disposed away from the polarization selective lens, such that the first color image has a first light path length, the second color image has a second light path length greater than the first light path length, and the third color image has a third light path length greater than the second light path length, and wherein the first anisotropic holographic screen, the second anisotropic holographic screen, and the third anisotropic holographic screen are disposed to offset chromatic aberration of the polarization selective lens.

14. A multi-image display apparatus comprising:

an image forming device configured to form an image;

a first polarization plate configured to transmit a first polarization component of the image provided from the image forming device;

a second polarization plate configured to transmit a second polarization component of external light that is provided from a path different from the image, the second polarization component being different from the first polarization component;

a screen configured to reflect and diffuse the image, and transmit the external light;

a polarization selective lens configured to focus the image having the first polarization component, and transmit the external light having the second polarization component without refraction; and a light guide plate disposed between the screen and the polarization selective lens, wherein the light guide plate comprises an input coupler configured to reflect incident light at an angle, and to provide the incident light into the light guide plate, and wherein the image forming device is disposed to provide the image to the input coupler of the light guide plate.

15. The multi-image display apparatus of claim 14, wherein the light guide plate is configured to totally reflect the image provided at an angle to the light guide plate by the input coupler, between a first surface of the light guide plate and a second surface of the light guide plate that is opposite to the first of the light guide plate, and the screen is directly disposed on the first surface of the light guide plate.

16. The multi-image display apparatus of claim 1, wherein the polarization selective lens is configured to focus light having a first circular polarization component having a first rotation direction and transmit, without change, light having a second circular polarization component having a second rotation direction which is opposite to the first rotation direction.

17. The multi-image display apparatus of claim 16, wherein the polarization selective lens comprises two geometric phase lenses and a polarization conversion plate between the two geometric phase lenses,
- wherein the two geometric phase lenses are configured to operate as convex lenses with respect to the light having the first circular polarization component, and operate as concave lenses with respect to the light having the second circular polarization component, and
- wherein the polarization conversion plate is configured to transmit, without change, the light having the first circular polarization component, and convert the light having the second circular polarization component into the light having the first circular polarization component.

18. The multi-image display apparatus of claim 16, wherein the first polarization plate comprises a first circular polarization plate configured to transmit the light having the first circular polarization component, and the second polarization plate comprises a second circular polarization plate configured to transmit the light having the second circular polarization component.

19. The multi-image display apparatus of claim 1, wherein the screen comprises a polarization selective screen configured to reflect and diffuse light having a first linear polarization component, and transmit light having a second linear polarization component that is perpendicular to the first linear polarization component,
- wherein the first polarization plate comprises a first linear polarization plate configured to transmit the light having the first linear polarization component, and the second polarization plate comprises a second linear polarization plate configured to transmit the light having the second linear polarization component perpendicular to the first linear polarization component, and
- wherein the multi-image display apparatus further comprises a ¼ wavelength plate disposed between the screen and the polarization selective lens.

\* \* \* \* \*